US 9,502,833 B2

(12) United States Patent
Sekino

(10) Patent No.: US 9,502,833 B2
(45) Date of Patent: Nov. 22, 2016

(54) CONNECTOR DEVICE WITH ROTATION BLOCKING AND GUIDING PORTIONS

(71) Applicant: YAZAKI CORPORATION, Minato-ku, Tokyo (JP)

(72) Inventor: Tetsuya Sekino, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/847,354

(22) Filed: Sep. 8, 2015

(65) Prior Publication Data

US 2015/0380882 A1 Dec. 31, 2015

Related U.S. Application Data

(63) Continuation of application No. PCT/JP2014/056408, filed on Mar. 12, 2014.

(30) Foreign Application Priority Data

Mar. 13, 2013 (JP) .................................. 2013-050156

(51) Int. Cl.
*H01R 13/629* (2006.01)
*H01R 24/38* (2011.01)
(Continued)

(52) U.S. Cl.
CPC .............. *H01R 24/38* (2013.01); *B60W 10/00* (2013.01); *H01R 13/62905* (2013.01); *F02D 2200/0602* (2013.01); *F02D 2400/22* (2013.01); *H01R 2107/00* (2013.01); *H01R 2201/26* (2013.01)

(58) Field of Classification Search
CPC ............ H01R 24/38; H01R 13/62905; H01R 2201/26; B60W 10/00

USPC ....... 439/252, 376, 378, 380, 374, 677, 680, 439/681, 546, 317, 300, 323, 34, 164, 534; 362/648
See application file for complete search history.

(56) References Cited

U.S. PATENT DOCUMENTS 4,802,861 A * 2/1989 Gaston ................. H01R 13/631
285/24
5,993,266 A * 11/1999 Mayer ................ H01R 13/5213
439/294

(Continued)

FOREIGN PATENT DOCUMENTS

CN 1761585 A 4/2006
CN 201365011 Y 12/2009
(Continued)

OTHER PUBLICATIONS

Chinese Official Action issued on Aug. 30, 2016 in the counterpart Chinese patent application.

*Primary Examiner* — Felix O Figueroa
*Assistant Examiner* — Paul Baillargeon
(74) *Attorney, Agent, or Firm* — Mots Law, PLLC

(57) ABSTRACT

A connector device includes: a first connector including a first housing; and a second connector including a second housing. When the first housing is not oriented in a direction in which the first housing is fitted into the second housing, the first housing becomes fitted into the second housing after rotation. The first connector includes a third connector attached to the first housing. The third connector has a third housing including a cylindrical portion. The first housing can move relative to the cylindrical portion between a pre-fit position and a fit-rotation position. The first housing and the cylindrical portion of the third housing are provided with: a rotation block portion to block rotation of the first housing relative to the cylindrical portion while at the pre-fit position; and a rotation guide portion to guide the rotation of the first housing relative to the cylindrical portion while at the fit-rotation position.

6 Claims, 15 Drawing Sheets

(51) Int. Cl.
*B60W 10/00* (2006.01)
*H01R 107/00* (2006.01)

(56) References Cited

U.S. PATENT DOCUMENTS

| | | | |
|---|---|---|---|
| 6,364,681 B1 | 4/2002 | Watanabe | |
| 7,367,833 B2 * | 5/2008 | Matsumoto | H01R 13/622 |
| | | | 439/315 |
| 2006/0240695 A1 | 10/2006 | Mattern et al. | |
| 2010/0003841 A1 | 1/2010 | Metzler et al. | |

FOREIGN PATENT DOCUMENTS

| | | |
|---|---|---|
| JP | H02-501340 A | 5/1990 |
| JP | H10-321296 A | 12/1998 |
| JP | 2000-182702 A | 6/2000 |

\* cited by examiner

US 9,502,833 B2

CONNECTOR DEVICE WITH ROTATION BLOCKING AND GUIDING PORTIONS

CROSS REFERENCE TO RELATED APPLICATIONS

This application is a continuation application of International Application No. PCT/JP2014/056408, filed on Mar. 12, 2014, which claims priority to Japanese Patent Application No. 2013-050156, filed on Mar. 13, 2013, the entire contents of which are incorporated by reference herein.

BACKGROUND

1. Technical Field

The present invention relates to a connector device including two housing portions configured to be fitted together to electrically connect terminals.

2. Description of the Related Art

A variety of connector devices to be attached to engines have been proposed (see US Patent Application Publication 2010/0003841). FIG. 15 shows one conventional example of such connector devices. A connector device 50 shown in FIG. 15 is attached to a cylinder head 70 of an engine, and is used to take out output from a built-in fuel pressure sensor device (not illustrated). The connector device 50 includes a wire harness-side connector 51 and a sensor-side connector 60.

The wire harness-side connector 51 includes a housing portion 52. First terminals 53 are placed inside the housing portion 52 on one end side, while external terminals 54 are placed inside the housing portion 52 on the other end side. The first terminals 53 are connected to the external terminals 54 with electrical wires W which are housed in the housing portion 52. The housing portion 52 includes a connector fitting portion 52a which contains the external terminals 54. An external connector (not illustrated) is fitted into the connector fitting portion 52a.

The sensor-side connector 60 includes: a sensor main body portion 61 inside which a sensor device (not illustrated) is placed; and a housing portion 63 which is fixed to the sensor main body portion 61, and inside which second terminals 62 are placed. A threaded portion 61a is formed in the outer periphery of the sensor main body portion 61. The sensor-side connector 60 is attached to the cylinder head 70 by screwing the sensor main body portion 61 to a threaded hole 70a in the cylinder head 70.

The sensor-side connector 60 is attached to the cylinder head 70, and a head cover 71 is thereafter attached onto the cylinder head 70. The wire harness-side connector 51 is inserted into a hole 71a in the head cover 71, and is fitted into the connector 60.

Since the sensor-side connector 60 is screwed to the threaded hole 70a in the cylinder head 70, the rotational position (direction) of the housing portion 63 of the sensor-side connector 60 is not constant. Furthermore, when fitted to the wire harness-side connector 51, the housing portion 63 of the sensor-side connector 60 is located in the depth of the hole 71a in the head cover 71. For this reason, the housing portion 63 of the sensor-side connector 60 cannot be visually clearly recognized, and it is accordingly difficult to align the housing portion 52 of the wire harness-side connector 51 with the housing portion 63 of the sensor-side connector 60 at the normal rotational position for their fitting. In short, the fitting workability is poor.

SUMMARY OF THE INVENTION

An aspect of the present invention is a connector device including: a first connector including a first housing portion inside which a first terminal is placed; and a second connector including a second housing portion inside which a second terminal is placed, the first housing portion being configured to rotate and be fitted into the second housing portion when the first housing portion is not oriented in a direction in which the first housing portion is fitted into the second housing portion, and while at a fitting completion position, the first terminal and the second terminal being connected together, wherein the first connector includes a third connector attached to the first housing portion, the third connector includes a third housing portion inside which a third terminal is placed, and the first terminal and the third terminal are electrically connected together with an electrical wire, the first housing portion is formed capable of moving relative to the third housing portion between a pre-fit position and a fit-rotation position, and the first housing portion and the third housing portion are provided with: a rotation block portion configured to, while at the pre-fit position, block rotation of the first housing portion relative to the third housing portion; and a rotation guide portion configured to, while at a rotation start position, guide the rotation of the first housing portion relative to the third housing portion.

The rotation block portion may include: a rotation check lock portion provided to one of the first housing portion and the third housing portion; and a locked portion which is provided to the other of the first housing portion and the third housing portion, and into which the rotation check lock portion is fitted while at the pre-fit position. The rotation guide portion may include the rotation check lock portion, and a rotation rail portion provided to the other of the first housing portion and the third housing portion, and configured to guide the rotation check lock portion while at the fit-rotation position. One of the first housing portion and the third housing portion may be provided with first and second rotation rail portions including first and second rotation prevention walls, and the other of the first housing portion and the third housing portion may be provided with first and second rotation check lock portions configured to move along the respective rotation rail portions. The first rotation prevention wall and the first rotation check lock portion may be configured such that the first rotation prevention wall allows rotation of the first rotation check lock portion beyond the first rotation prevention wall in one rotational direction, and that the first rotation prevention wall blocks rotation of the first rotation check lock portion beyond the first rotation prevention wall in another rotational direction. The second rotation prevention wall and the second rotation check lock portion may be configured such that the second rotation prevention wall blocks rotation of the second rotation check lock portion beyond the second rotation prevention wall in the one rotational direction, and that the second rotation prevention wall allows rotation of the second rotation check lock portion beyond the second rotation prevention wall in the other rotational direction. The first rotation prevention wall may be set at such a rotational position that the first rotation check lock portion is blocked after rotating by 180 degrees or more in the other rotational direction. The second rotation prevention wall may be set at such a rotational position that the second rotation check lock portion is blocked after rotating by 180 degrees or more in the one rotational direction. One of the first and second housing portions may be provided with a guide rib, and the other of the first and second housing portions may be provided with a rotational direction guide portion configured to guide the guide rib such that no matter what rotational position the guide rib is located at, the first and second housing portions are located at a normal fit rotation position before the first terminal and the second terminal reach a position where the first terminal starts to contact the second terminal, whereby the first housing portion may rotate and be fitted to the second housing portion when the first housing portion is not oriented in the direction in which the first housing portion is fitted into the second housing portion. One of the first and second housing portions may be provided with a guide rib, and the other of the first and second housing portions may be provided with a rotational direction guide portion configured to guide the guide rib such that no matter what rotational position the guide rib is located at, the first and second housing portions are located at a normal fit rotation position before the first terminal and the second terminal reach a position where the first terminal starts to contact the second terminal, whereby the first housing portion may rotate and be fitted to the second housing portion when the first housing portion is not oriented in the direction in which the first housing portion is fitted to the second housing portion.

DESCRIPTION OF THE EMBODIMENTS

Based on the drawings, descriptions will be hereinbelow provided for an embodiment of the present invention.

Figure 1:
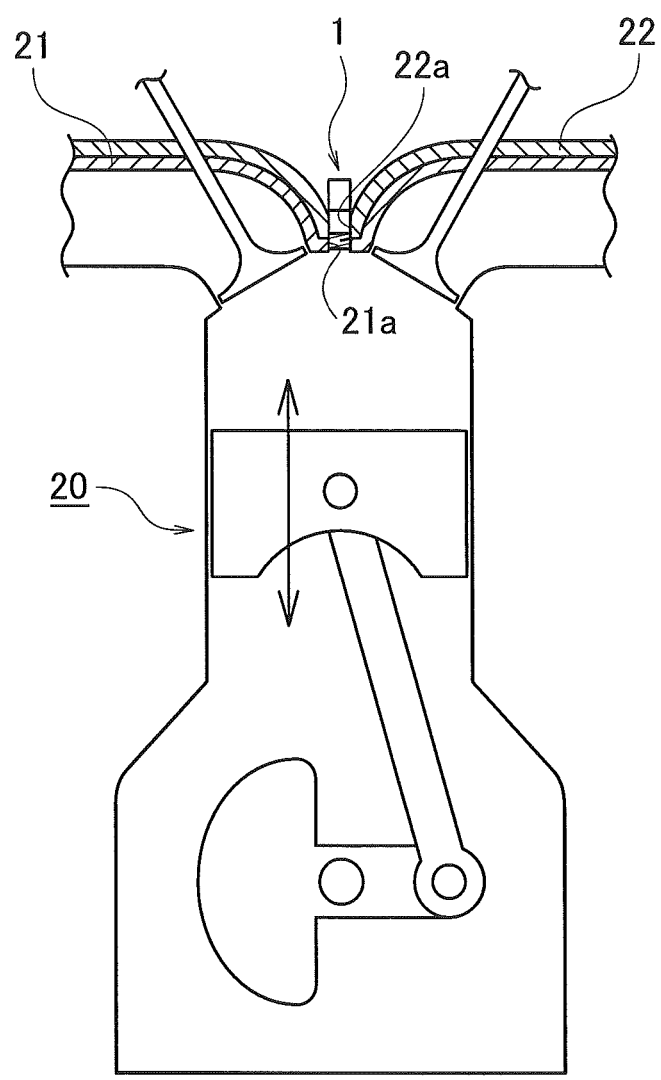
FIG. 1 is a schematic cross-sectional view of an engine of an embodiment of the present invention.

FIGS. 1 to 13 show the embodiment of the present invention. As shown in FIG. 1, a connector device 1 of this embodiment integrally includes a combustion pressure sensor device (not illustrated), and is attached to a cylinder head 21 of an engine 20. The descriptions follow below.

Figure 2:
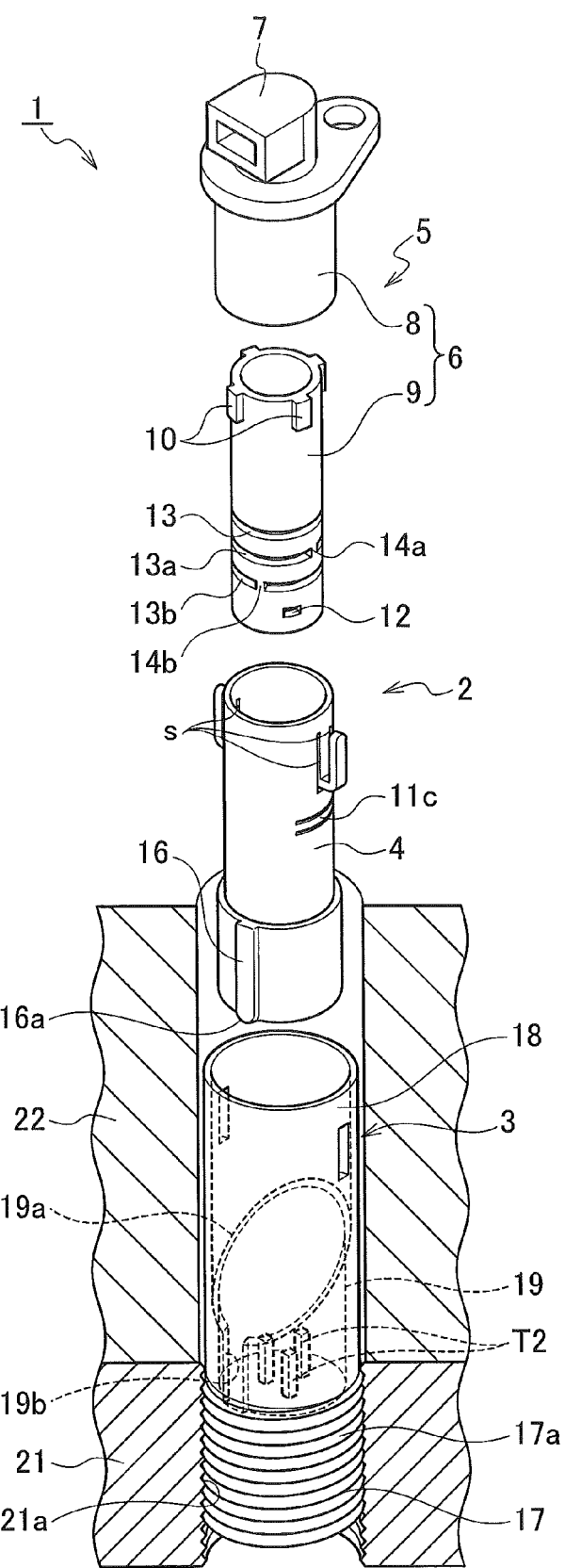
FIG. 2 is an exploded perspective view of a connector device of the embodiment of the present invention.
Figure 3:
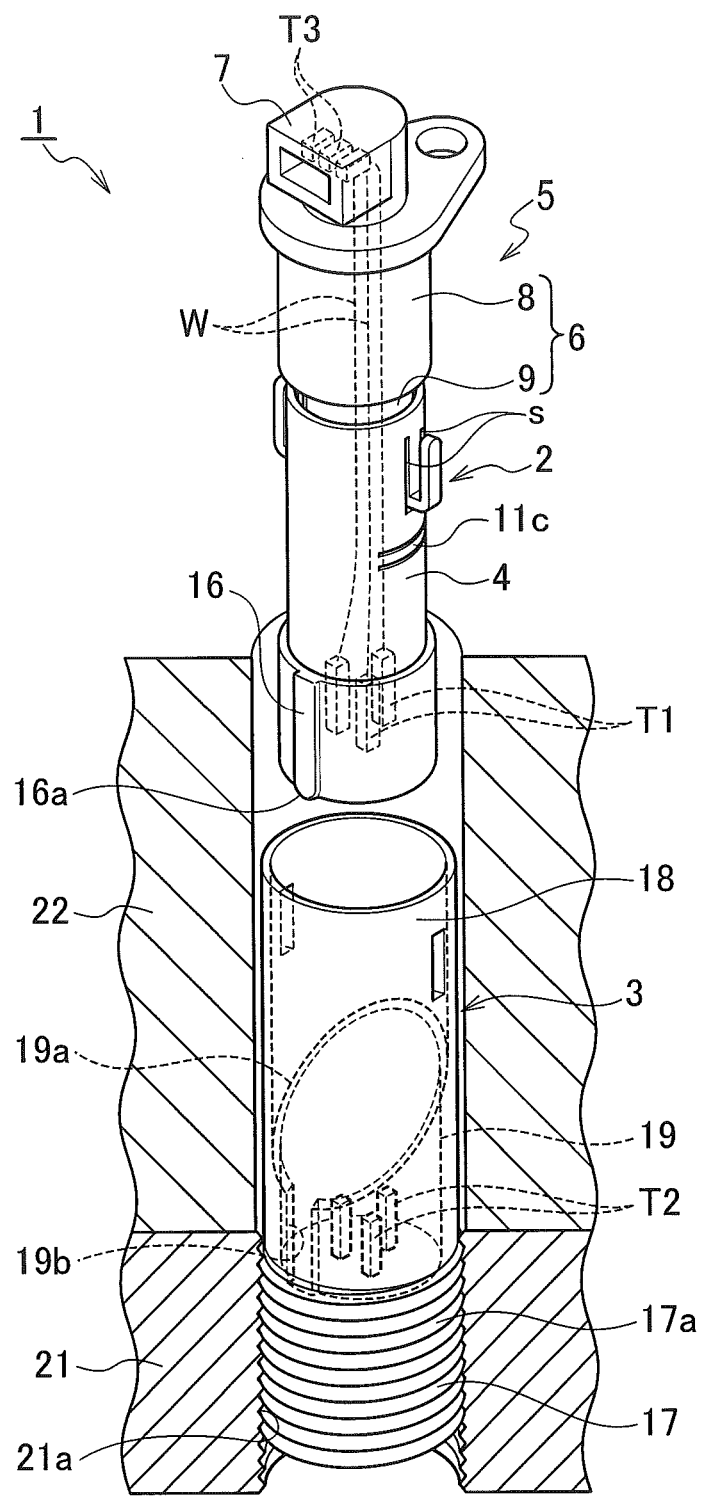
FIG. 3 is a perspective view of the pre-assembled connector device of the embodiment of the present invention.
Figure 4A:
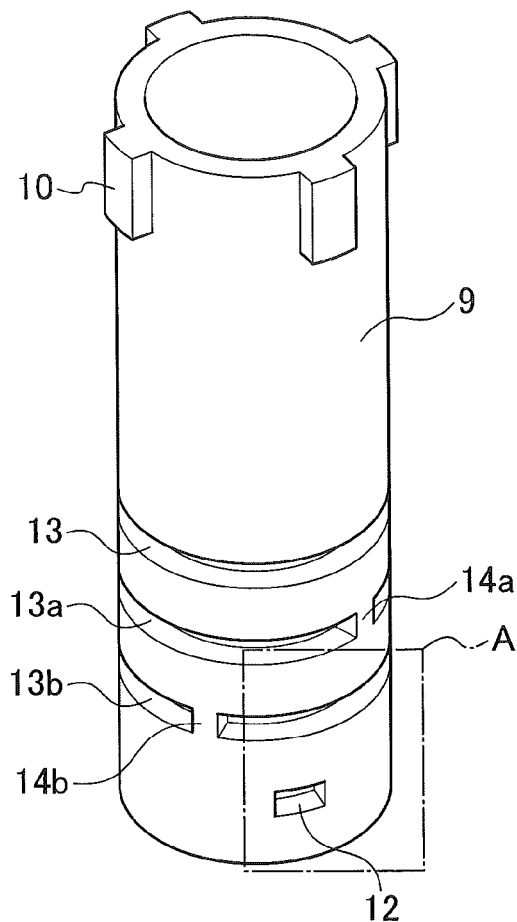
FIG. 4A is a perspective view of a cylindrical portion of the embodiment of the present invention.
Figure 4B:
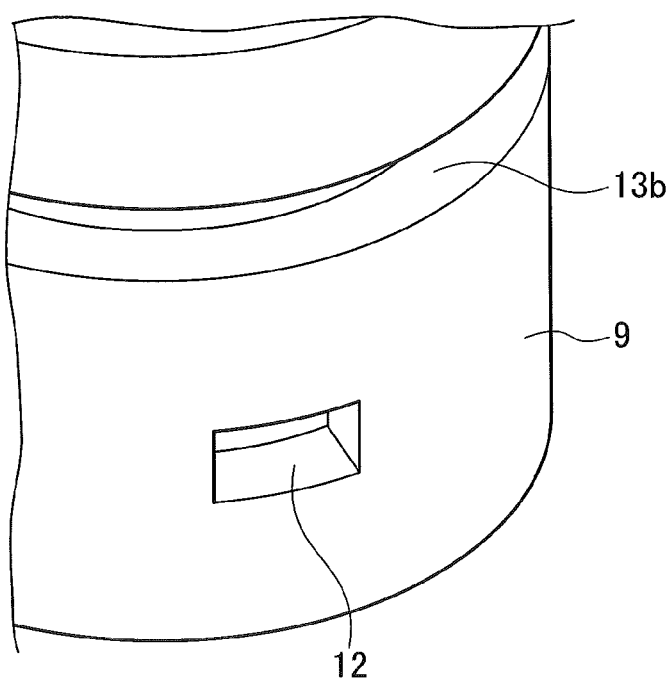
FIG. 4B is a magnified perspective view of an A section shown in FIG. 4A.

As shown in FIGS. 2 and 3, the connector device 1 of the embodiment includes: a wire harness-side connector 2 as a first connector; and a sensor-side connector 3 as a second connector. The wire harness-side connector 2 includes: a first housing portion 4 in which first terminals T1 are placed; and a third connector 5 which includes a third housing portion 6 attached to the first housing portion 4.

The third housing portion 6 is formed from: a main body portion 8 which includes a connector fitting portion 7 containing third terminals T3; and a cylindrical portion 9 provided between the first housing portion 4 and the main body portion 8, and fitted into the main body portion 8. The first terminals T1 are connected to the third terminals T3 by use of electrical wires W which pass through the hollow cylindrical portion 9, and which are housed in the first housing portion 4 and the third housing portion 6.

A fitting direction of the connector fitting portion 7 is almost vertical to a fitting direction in which the first housing portion 4 and the third housing portion 6 are fitted together. An external connector (not illustrated) of a vehicle body-side wire harness is fitted into the connector fitting portion 7.

Multiple engagement ribs 10 extending in an axial direction are formed on an upper end-side outer periphery of the cylindrical portion 9. The engagement of each engagement ribs 10 with the inside of the main body portion 8 makes the cylindrical portion 9 fitted into the main body portion 8. Thereby, the cylindrical portion 9 and the main body portion 8 rotate integrally.

The cylindrical portion 9 of the third housing portion 6 is disposed inside the first housing portion 4 in a way that the cylindrical portion 9 overlaps the first housing portion 4. As described in detail later, the first housing portion 4 is capable of changing its axial position relative to the third housing portion 6 between a pre-fit position shown in FIG. 8 and a fit-rotation position shown in FIG. 10 which is away from the pre-fit position in such a direction that the axial position change increases an amount of overlap between the cylindrical portion 9 and the first housing portion 4. An overlap area of overlap between the cylindrical portion 9 and the first housing portion 4 is provided with: a rotation block portion (rotation block means) configured to block rotation of the first housing portion 4 relative to the third housing portion 6 at the pre-fit position; a rotation guide portion (rotation guide means) configured to guide the rotation of the first housing portion 4 relative to the third housing portion 6 at the fit-rotation position; and an excessive rotation restriction portion (excessive rotation restriction means) configured to restrict the excessive rotation of the first housing portion 4 relative to the third housing portion 6 at the fit-rotation position. The descriptions follow below.

As shown in FIGS. 4, 5 and 7 to 11, a lock groove 12 as a locked portion is formed in an outer peripheral surface of the cylindrical portion 9 of the third housing portion 6. A dimension of the lock groove 12 is set slightly larger than a width of a second rotation check lock portion 11*b*, which will be described later. A rotation base rail portion 13, a first rotation rail portion 13*a* and a second rotation rail portion 13*b* are formed above the lock groove 12 in the outer peripheral surface of the cylindrical portion 9 of the third housing portion 6 in this order from above. The rotation base rail portion 13 is a circumferential groove formed extending throughout a whole circumference. The first rotation rail portion 13*a* and the second rotation rail portion 13*b* are circumferential grooves which are partially closed by a first rotation prevention wall 14*a* and a second rotation prevention wall 14*b*, respectively. The first rotation prevention wall 14*a* and the second rotation prevention wall 14*b* are set at their respective positions which are different from each other in a circumferential direction. Each of the first rotation prevention wall 14*a* and the second rotation prevention wall 14*b* includes a taper surface t (shown in FIGS. 11A and 11B) and a vertical surface h (shown in FIGS. 11A and 11B) which are located side-by-side in the circumferential direction. The taper surface t and the vertical surface h are set in their respective directions different from each other. In addition, the second rotation prevention wall 14*b* and the lock groove 12 are set at their respective positions different from each other in the circumferential direction as well. Furthermore, a vertical surface k is formed in the taper surface t of the second rotation prevention wall 14*b*. As described later, the vertical surface k is formed such that the vertical surface k comes into contact with a vertical surface 11*e* of a first rotation check lock portion 11*a*. For this reason, the vertical surface k is formed vertical to the circumferential direction of the cylindrical portion 9, for example. Incidentally, a similar vertical surface may be provided to the taper surface t of the first rotation prevention wall 14*a*.

Rotation guide portions 11, the first rotation check lock portion 11*a* and the second rotation check lock portion 11*b* are provided to an inner peripheral side of the first housing portion 4 in this order from above. Each rotation guide portion 11 is a protrusion projecting toward the inner periphery, and slits s enable the rotation guide portion 11 to retreat outward from the inner peripheral surface through elastic deformation.

Figure 7A:
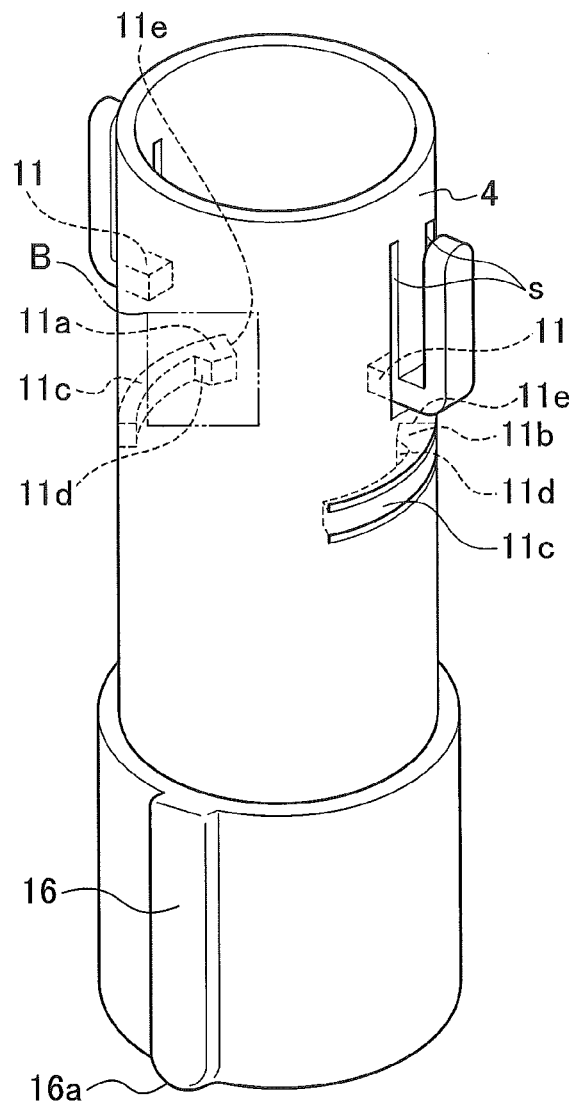
FIG. 7A is a perspective view of a first housing portion of the embodiment of the present invention.
Figure 7B:
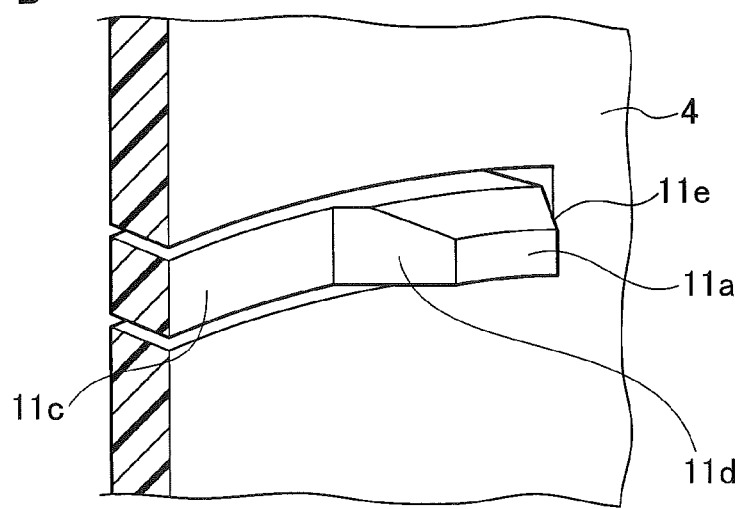
FIG. 7B is a magnified perspective view of a B section shown in FIG. 7A as viewed from inside.

As shown in FIGS. 7A and 7B, the first rotation check lock portion 11*a* and the second rotation check lock portion 11*b* are integrally formed in the first housing portion 4 in a way that their respective elastic arm portions 11*c* join the first rotation check lock portion 11*a* and the second rotation check lock portion 11*b* to the first housing portion 4. Elastic deformation of the elastic arm portions 11*c* enables the first rotation check lock portion 11*a* and the second rotation check lock portion 11*b* to retreat outward from the inner peripheral surface. In the first rotation check lock portion 11*a* and the second rotation check lock portion 11*b*, their surfaces on the side of the elastic arm portions 11*c* are formed as taper surfaces 11*d* (shown in FIGS. 9 and 11), while their surfaces on the side of the tip ends are formed as vertical surfaces 11*e* (shown in FIGS. 9 and 11).

Figure 8:
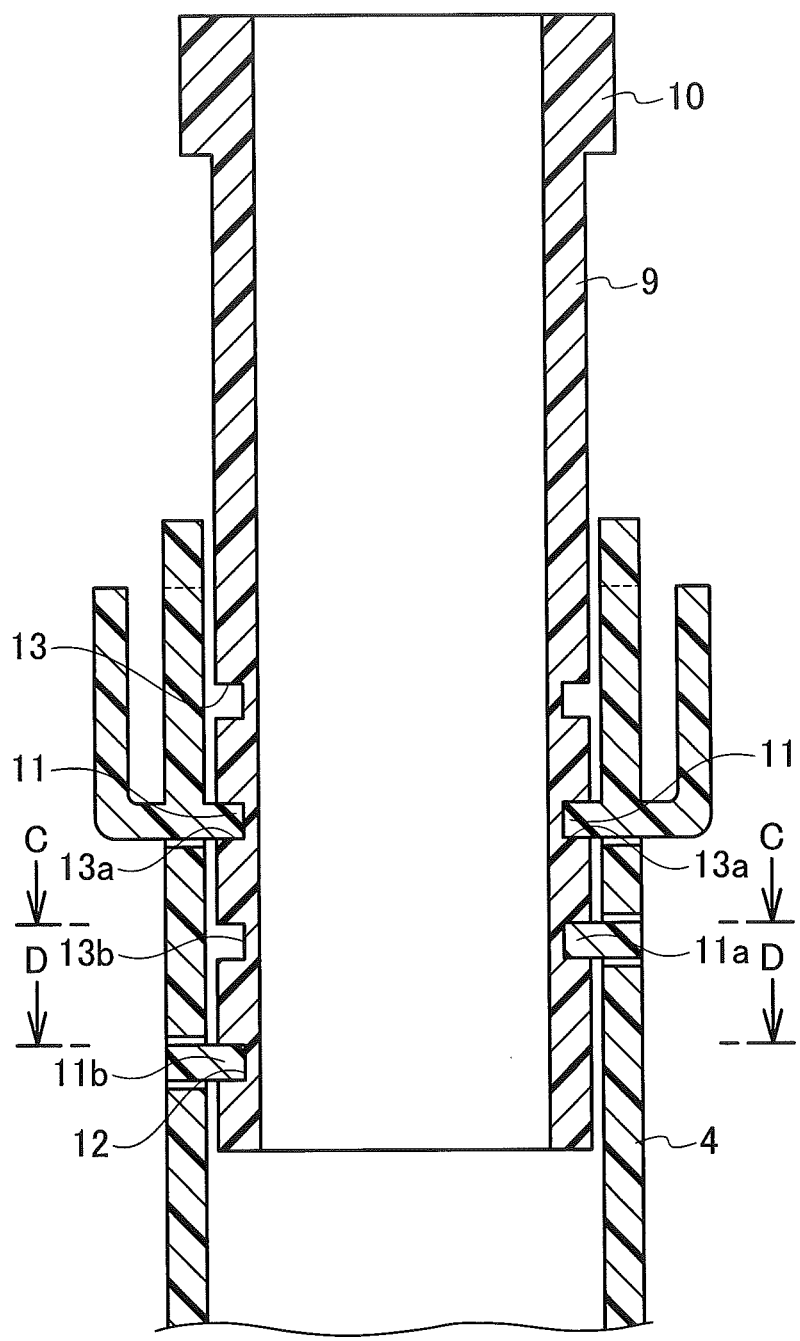
FIG. 8 is a cross-sectional view of the cylindrical portion and the first housing portion of the embodiment of the present invention which are at a pre-fit position.
Figure 9A:
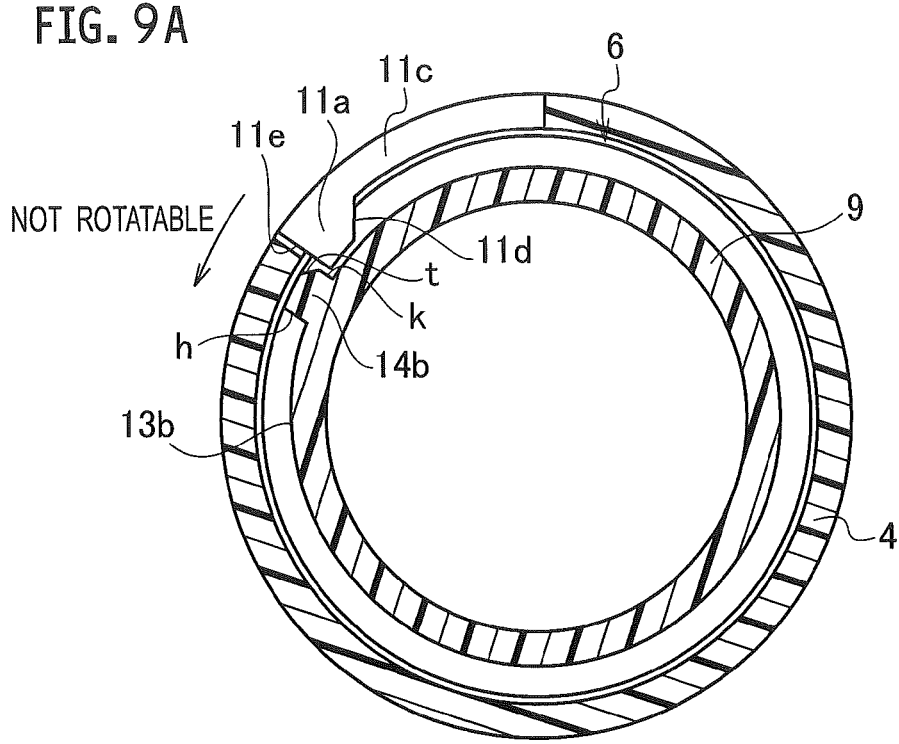
FIG. 9A is a cross-sectional view taken along the C-C line of FIG. 8.
Figure 9B:
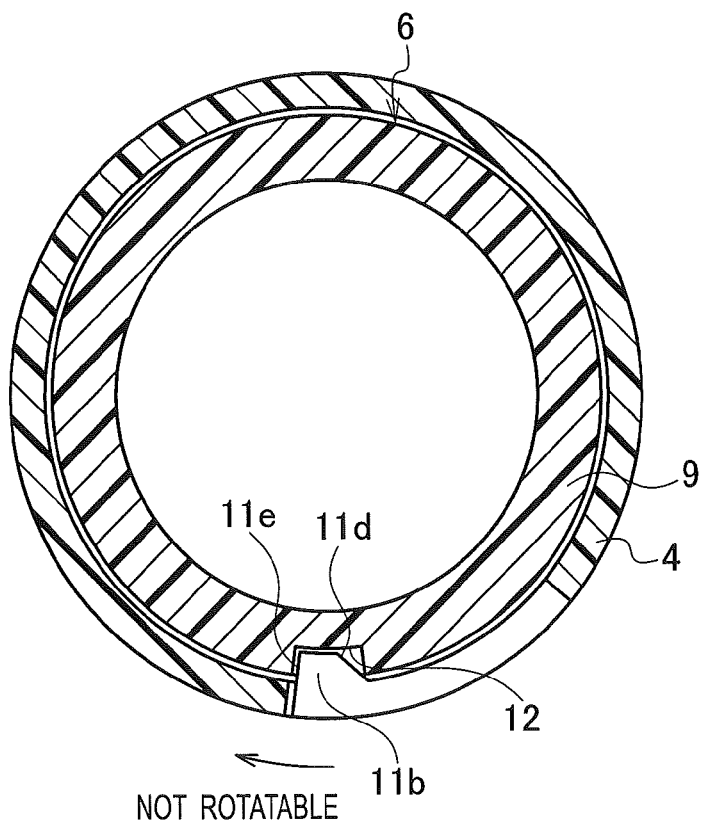
FIG. 9B is a cross-sectional view taken along the D-D line of FIG. 8.

As shown in FIGS. 8, 9A and 9B, while at the pre-fit position, the rotation guide portions 11 are located entering the inside of the first rotation rail portion 13*a*. The first rotation check lock portion 11*a* is located in the second rotation rail portion 13*b*, and at its position of contact with the second rotation prevention wall 14*b*. To put it specifically, the vertical surface 11*e* of the first rotation check lock portion 11*a* comes into contact with the vertical surface k of the second rotation prevention wall 14*b*. This blocks counterclockwise rotation of the first housing portion 4 relative to the third housing portion 6 (see FIG. 9A). The second rotation check lock portion 11*b* enters the inside of the lock groove 12. This blocks clockwise rotation of the first housing portion 4 relative to the third housing portion 6 (see FIG. 9B). Thereby, while at the pre-fit position, the rotation of the first housing portion 4 relative to the third housing portion 6 are blocked. In other words, the rotation block portion are formed from the first rotation check lock portion 11*a* and the second rotation check lock portion 11*b*, as well as the second rotation prevention wall 14*b* and the lock groove 12.

Once while at the pre-fit position, force directed upward in the axial direction is applied to the first housing portion 4, the rotation guide portions 11, the first rotation check lock portion 11*a* and the second rotation check lock portion 11*b* change their positions in direction in which the rotation guide portions 11, the first rotation check lock portion 11*a* and the second rotation check lock portion 11*b* retreat from the inner peripheral surface toward the outer periphery of the cylindrical portion 9 through elastic deformation, and move to the fit-rotation position.

Figure 10:
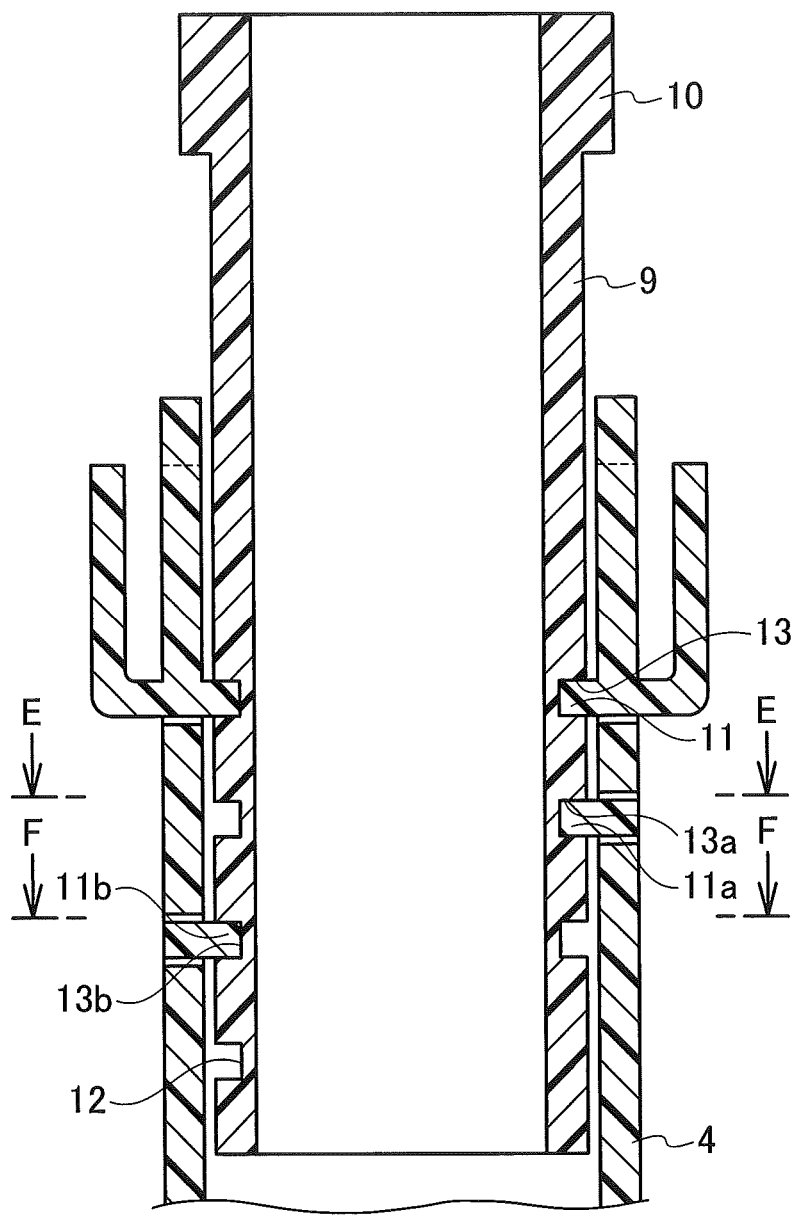
FIG. 10 is a cross-sectional view of the cylindrical portion and the first housing portion of the embodiment of the present invention which are at a fit-rotation position.
Figure 11A:
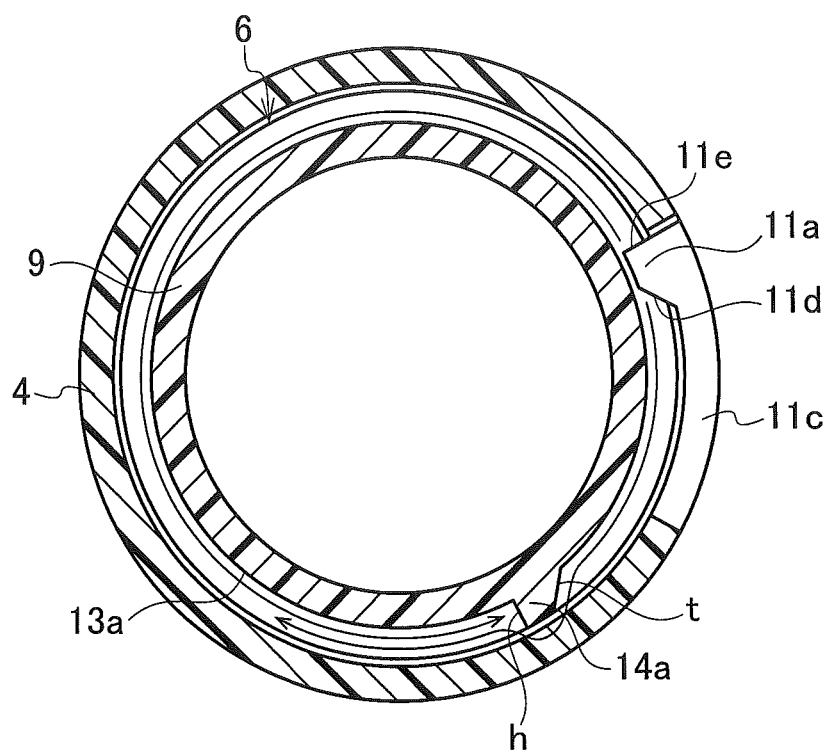
FIG. 11A is a cross-sectional view taken along the E-E line of FIG. 10.
Figure 11B:
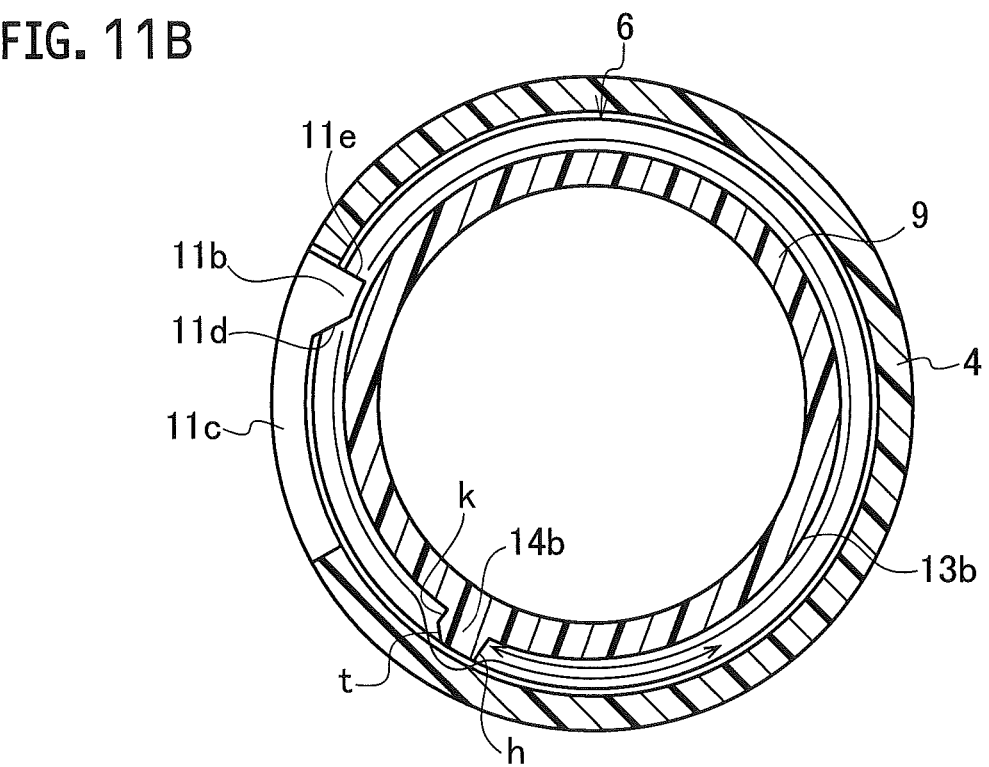
FIG. 11B is a cross-sectional view taken along the F-F line of FIG. 10.

As shown in FIGS. 10, 11A and 11B, while at the fit-rotation position, the rotation guide portions 11 are located entering the inside of the rotation base rail portion 13. The first rotation check lock portion 11*a* enters the inside of the first rotation rail portion 13*a*. The second rotation check lock portion 11*b* enters the inside of the second rotation rail portion 13*b*. These enable the first housing portion 4 to rotate relative to the third housing portion 6. In other words, the rotation guide portion is formed from the rotation guide portions 11, the first rotation check lock portion 11*a* and the second rotation check lock portion 11*b*, as well as the rotation base rail portion 13, the first rotation rail portion 13*a* and the second rotation rail portion 13*b*.

As shown in FIG. 11A, while at the fit-rotation position, the clockwise rotation of the first rotation check lock portion 11*a* makes the taper surface 11*d* of the first rotation check lock portion 11*a* come into contact with the taper surface t of the first rotation prevention wall 14*a*. The contact of the taper surface 11*d* of the first rotation check lock portion 11*a* with the taper surface t of the first rotation prevention wall 14*a* during the clockwise rotation allows the rotation of the first rotation check lock portion 11*a* beyond the first rotation prevention wall 14*a*. The counterclockwise rotation of the first rotation check lock portion 11*a* makes the vertical surface 11*e* of the first rotation check lock portion 11*a* come into contact with the vertical surface h of the first rotation prevention wall 14*a*. For this reason, the first rotation prevention wall 14*a* blocks the rotation of the first rotation check lock portion 11*a* beyond the first rotation prevention wall 14*a*. The first rotation prevention wall 14*a* is set at such a rotational position that the first rotation check lock portion 11*a* is blocked after rotating by 180 degrees or more in the other rotational direction. To put it specifically, the first rotation prevention wall 14*a* is set at a rotational position of approximately 270 degrees.

As shown in FIG. 11B, while at the fit-rotation position, the clockwise rotation of the second rotation check lock portion 11*b* makes the vertical surface 11*e* of the second rotation check lock portion 11*b* come into contact with the vertical surface h of the second rotation prevention wall 14*b*. For this reason, the second rotation prevention wall 14*b* blocks the rotation of the second rotation check lock portion 11*b* beyond the second rotation prevention wall 14*b*. The counterclockwise rotation of the second rotation check lock portion 11*b* makes the taper surface 11*d* of the second rotation check lock portion 11*b* come into contact with the taper surface t of the second rotation prevention wall 14*b*. The contact of the taper surface 11*d* of the second rotation check lock portion 11b with the taper surface t of the second rotation prevention wall 14b allows the rotation of the second rotation check lock portion 11b beyond the second rotation prevention wall 14b. The second rotation prevention wall 14b is set at such a rotational position that the second rotation check lock portion 11b is blocked after rotating by 180 degrees or more in the clockwise direction. To put it specifically, the second rotation prevention wall 14b is set at a rotational position of approximately 270 degrees.

Let us assume that the rotation start positions of the first rotation check lock portion 11a and the second rotation check lock portion 11b are as shown in FIGS. 11A and 11B. The clockwise rotation, first of all, makes the first rotation check lock portion 11a come into contact with first rotation prevention wall 14a. However, the first rotation check lock portion 11a rotates beyond the first rotation prevention wall 14a. The continuing clockwise rotation comes to restrict the further rotation of the second rotation check lock portion 11b beyond the position where the second rotation check lock portion 11b comes into contact with the second rotation prevention wall 14b. This rotation range is at a rotation angle which exceeds 180 degrees (approximately 270 degrees in the embodiment). Once again, let us assume that the rotation start positions of the first rotation check lock portion 11a and the second rotation check lock portion 11b are as shown in FIGS. 11A and 11B. The counterclockwise rotation makes the second rotation check lock portion 11b come into contact with the second rotation prevention wall 14b. However, the second rotation check lock portion 11b rotates beyond second rotation prevention wall 14b. The continuing counterclockwise rotation comes to restrict the further rotation of the first rotation check lock portion 11a beyond the position where the first rotation check lock portion 11a comes into contact with the first rotation prevention wall 14a. This rotation range is at a rotation angle which exceeds 180 degrees (approximately 270 degrees in the embodiment). Thereby, the first housing portion 4 is capable of rotating relative to the third housing portion 6 by an angle of more than 180 degrees in the clockwise and counterclockwise directions, while the first housing portion 4 is restricted from making excessive rotation of more than 270 degrees. That is to say, the rotation of the first housing portion 4 is restricted to 270 degrees at maximum. The maximum rotation range can be controlled by the relative rotational positions between the first rotation check lock portion 11a and the first rotation prevention wall 14a, as well as the relative rotational positions between the second rotation check lock portion 11b and the second rotation prevention wall 14b. The limit of the maximum rotation range is 360 degrees. In other words, the excessive rotation restriction portion is formed from the first rotation check lock portion 11a and the first rotation prevention wall 14a, as well as the second rotation check lock portion 11b and the second rotation prevention wall 14b.

A guide rib 16 is projectingly provided to a low end-side outer periphery of the first housing portion 4. The entire area of the lower end surface of the guide rib 16 is formed in the shape of an arc surface 16a. The arc surface 16a is lowest at its center, and the left and right sides of the arc surface 16a become gradually higher.

The sensor-side connector 3 includes: a sensor main body portion 17 with a combustion pressure sensor device (not illustrated) placed in its inside; an outer guide cylindrical portion 18 fixed to the sensor main body portion 17; and a second housing portion 19 fixed to the sensor main body portion 17, and placed inside the outer guide cylindrical portion 18.

A threaded portion 17a is formed in an outer periphery of the sensor main body portion 17. The sensor-side connector 3 is attached to the cylinder head 21 by screwing the sensor main body portion 17 into a threaded hole 21a of the cylinder head 21. This screwed fastening allows the second housing portion 19 of the sensor-side connector 3 to be attached to the cylinder head 21 in an arbitrary direction (rotational position), but not in a specific direction (rotational position).

The outer guide cylindrical portion 18 is shaped like a cylinder, and its upper surface is open.

The second housing portion 19 is shaped like a cylinder as described in detail below, and its upper surface is open. Second terminals T2 are provided inside a fitting chamber of the second housing portion 19 whose upper surface is open. The second terminals T2 are configured to take out output from the combustion pressure sensor device.

The second housing portion 19 is shaped like a cylinder whose upper end surface is cut diagonally. This diagonal upper end surface is formed as a guide rail surface 19a which serves as a rotational direction guide portion. In other words, the guide rail surface 19a is an inclined surface formed such that the upper end surface of the cylindrical second housing portion 19 is highest at a position opposite a normal rotation fit position, and lowest at the normal rotation fit position. Once the guide rib 16 comes into contact with the guide rail surface 19a, the guide rail surface 19a guides the guide rib 16 in order that the first housing portion 4 and the second housing portion 19 are located at the normal rotation fit position before the first terminals T1 and the second terminals T2 reach a fitting position where the first terminals T1 and the second terminals T2 start to contact together.

A straight guide groove 19b which is open to the lowermost position of the guide rail surface 19a is formed in the second housing portion 19. The guide groove 19b restricts the rotation of the guide rib 16, and allows the first housing portion 4 to only move in a way that the first housing portion 4 is fitted into the second housing portion 19 at the normal fit rotation position. Once the guide rib 16 enters the guide groove 19b, the first terminals T1 of the first housing portion 4 start to contact the second terminals T2. The first terminals T1 and the second terminals T2 come into appropriate contact with the second terminals T2 at a fitting completion position where the guide rib 16 enters the depth of the guide groove 19b.

In the configuration, the wire harness-side connector 2 is attached to the cylinder head 21, and a head cover 22 is thereafter attached onto the cylinder head 21. A hole 22a is formed in the head cover 22 at an attachment position where the sensor-side connector 3 is attached to the head cover 22. The wire harness-side connector 2 is fitted through the hole 22a.

In this process, the wire harness-side connector 2 is set at the pre-fit position. As shown in FIG. 9A, while at the pre-fit position, the first rotation check lock portion 11a is in contact with the second rotation prevention wall 14b, and the rotation of the first rotation check lock portion 11a in one rotational direction (the counterclockwise direction in FIG. 9A) is thus blocked by the second rotation prevention wall 14b. As shown in FIG. 9B, the second rotation check lock portion 11b enters the lock groove 12, and the rotation of the second rotation check lock portion 11b in the other rotational direction (the clockwise direction in FIG. 9B) is thus blocked by the lock groove 12. In other words, the forward and reverse rotation of the first housing portion 4 relative to the third housing portion 6 is blocked. This makes it possible to prevent twist of the electrical wires W before the fitting work.

Next, descriptions will be provided for how to fit the wire harness-side connector 2. With the direction (rotational position) of the connector fitting portion 7 directed in a desired direction, the wire harness-side connector 2 is inserted into the outer guide cylindrical portion 18 via the hole 22a of the head cover 2. Thereby, as shown in FIG. 12A, the guide rib 16 of the first housing portion 4 comes into contact with an arbitrary area of the guide rail surface 19a of the second housing portion 19, except for in the case where the first housing portion 4 is fitted into the second housing portion 19 at the normal fit rotation position.

When the first housing portion 4 is further fitted into the second housing portion 19 from the above state, reaction force from the guide rail surface 19a makes upward pressure force applied to the first housing portion 4, and the position of the first housing portion 4 relative to the third housing portion 6 moves to the fit-rotation position shown in FIGS. 10 and 11. While at the fit-rotation position, since the first and second rotation check lock portions 11a, 11b of the first housing portion 4 are respectively guided by the rotation rail portions 13a, 13b of the cylindrical portion 9 of the third housing portion 6, the first housing portion 4 becomes capable of rotating relative to the third housing portion 6.

Figure 5:
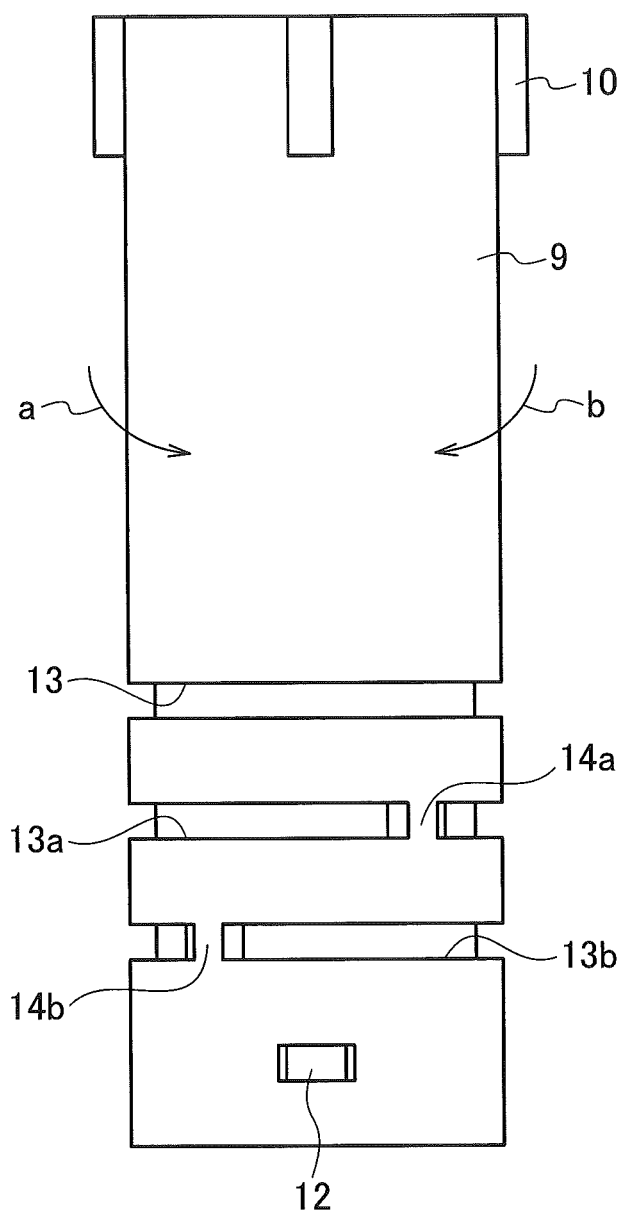
FIG. 5 is a front view of the cylindrical portion of the embodiment of the present invention.
Figure 6:
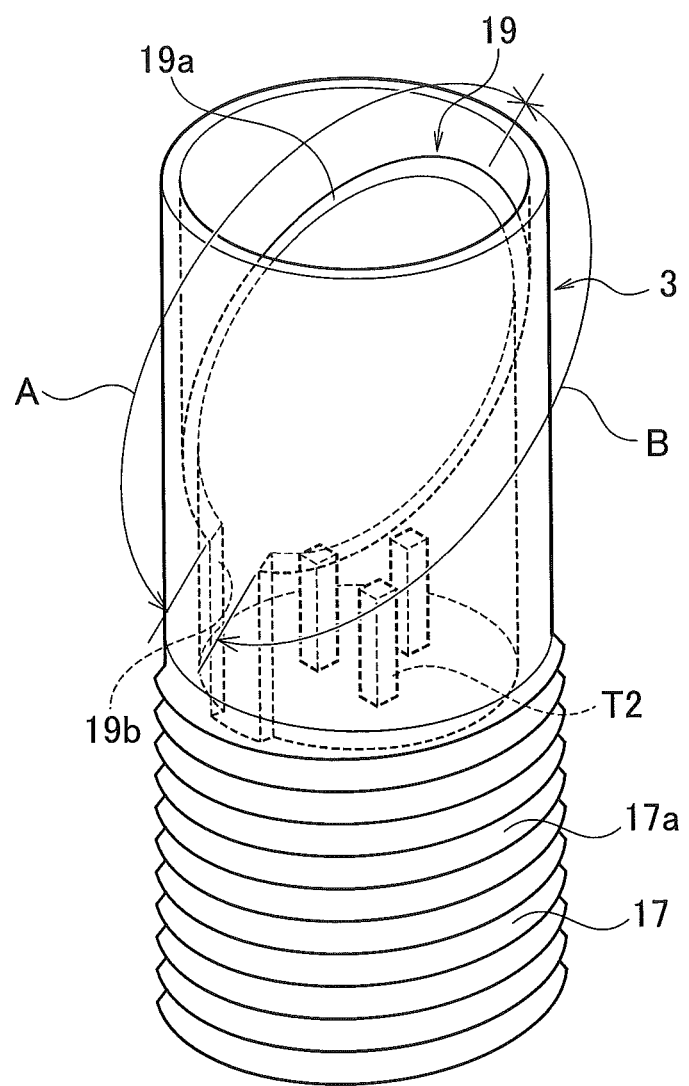
FIG. 6 is a perspective view of a second connector of the embodiment of the present invention.
Figures 12A, 12B:
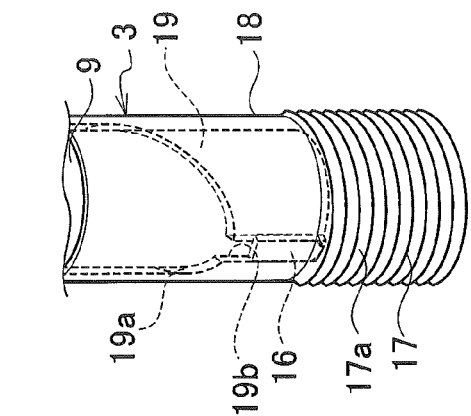
FIGS. 12A to 12D are perspective views showing connector fitting processes.
Figures 12C, 12D:
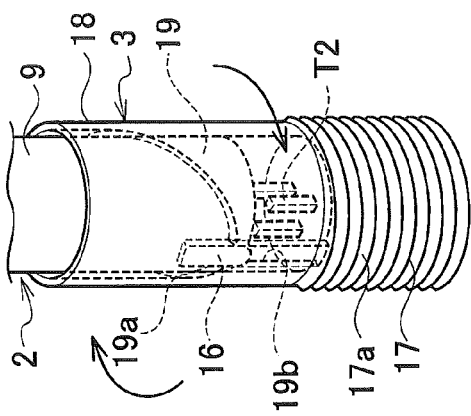

Thereafter, when as shown in FIG. 12B, the guide rib 16 comes into contact with an A area shown in FIG. 6, the first housing portion 4 moves in a direction in which the first housing portion 4 is fitted deeper, while rotating in an a-arrow direction shown in FIG. 5. When the guide rib 16 comes into contact with a B area shown in FIG. 6, the first housing portion 4 moves in a direction in which the first housing portion 4 is fitted deeper, while rotating in a b-arrow direction shown in FIG. 5 (this state is shown in FIG. 12B). In this manner, the first housing portion 4 comes to the rotational position where the guide rib 16 is located at the lowermost position of the guide rail surface 19a, as shown in FIG. 12C. Thereby, the first housing portion 4 and the second housing portion 19 come to the normal fit rotation position. Thereafter, when the first housing portion 4 is even further fitted into the second housing portion 19, the guide rib 16 enters the straight guide groove 19b, and is inserted into the straight guide groove 19b until the guide rib 16 reaches the fitting completion position, as shown in FIG. 12D. While the guide rib 16 is going through the straight guide groove 19b, the first terminals T1 start to be connected to the second terminals T2. When the guide rib 16 reaches the fitting completion position, the first terminals T1 and the second terminals T2 are located at the appropriate connection position. The connection ends with this.

In addition, when the fitting of the first housing portion 4 into the second housing portion 19 is started while at the normal fit rotation position, the guide rib 16 directly enters the straight guide groove 19b without sliding over the guide rail surface 19a, and is inserted into the guide groove 19b until the guide rib 16 reaches the fitting completion position, as shown in FIG. 12D. While the first housing portion 4 is being fitted into the second housing portion 19, external force pressing the first housing portion 4 upward in the axial direction is applied to the first housing portion 4, the position of the first housing portion 4 relative to the third housing portion 6 moves to the fit-rotation position shown in FIGS. 10 and 11. Thereby, the third housing portion 6 becomes capable of rotating relative to the first housing portion 4, and accordingly becomes capable of rotating relative to the second housing portion 19.

When the direction of the opening of the connector fitting portion 7 needs to be adjusted, the adjustment can be achieved by turning the third housing portion 6.

As described above, the first housing portion 4 is formed capable of moving relative to the third housing portion 6 between the pre-fit position and the fit-rotation position. The first housing portion 4 and the third housing portion 6 are provided with: the rotation block portion configured to, while at the pre-fit position, block the rotation of the first housing portion 4 relative to the third housing portion 6; and the rotation guide portion configured to, while at the fit-rotation position, guide the rotation of the first housing portion 4 relative to the third housing portion 6.

For the above reasons, while the first housing portion 4 and the third housing portion 6 are at the pre-fit position, the rotation block portion blocks the rotation of the first housing portion 4 relative to the third housing portion 5. Accordingly, the rotation before the connector fitting can be prevented. This makes it possible to prevent twist of the electrical wires W before the connector fitting. Furthermore, while the first housing portion 4 and the third housing portion 6 are at the fit-rotation position, the rotation guide portion guides the rotation of the first housing portion 4 relative to the third housing portion 5, and the first housing portion 4 rotates relative to the third housing portion 6. This enables the connector fitting operation to be performed. Thereby, the rotation other than due to the connector fitting operation can be blocked. Accordingly, it is possible to prevent excessive twist of the electrical wires W laid between the first terminals T1 and the third terminals T3.

While at the fit-rotation position, the first housing portion 4 is capable of rotating relative to the third housing portion 6 by 180 degrees or more in both the leftward and rightward rotational directions as the maximum rotational range. This enables a secure connector fitting operation, since the rotation at the maximum angle of 180 degrees in both the leftward and rightward rotational directions is needed for the connector fitting. On the other hand, the first housing portion 4 and the third housing portion 6 are designed such that while at the fit-rotation position, the maximum rotational range in both the leftward and rightward rotational directions can be reduced to less than 360 degrees (approximately 270 degrees in the embodiment). This makes it possible to prevent excessive twist of the electrical wires W.

Figure 13A:
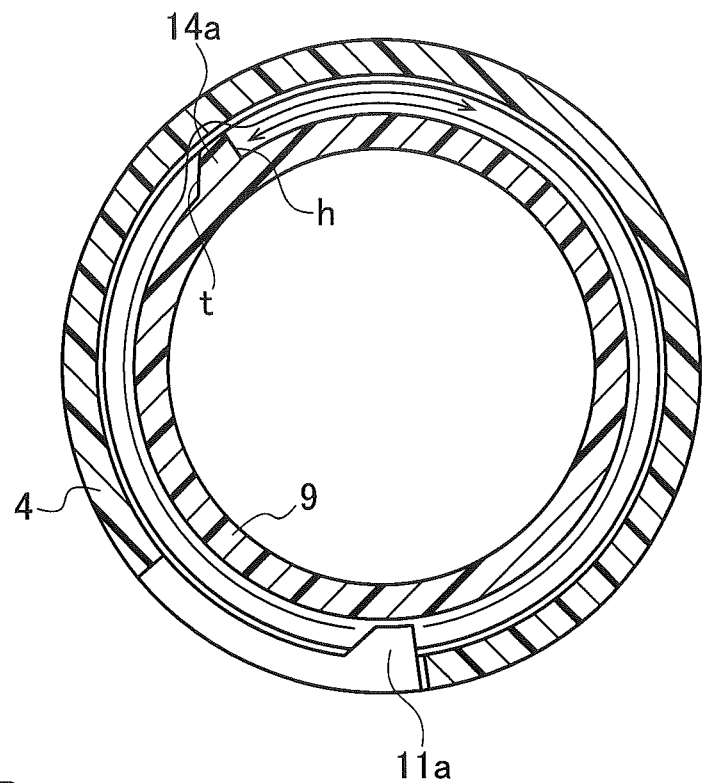
FIG. 13A is a cross-sectional view of a first connector and a cylindrical portion of a first comparative example.
Figure 13B:
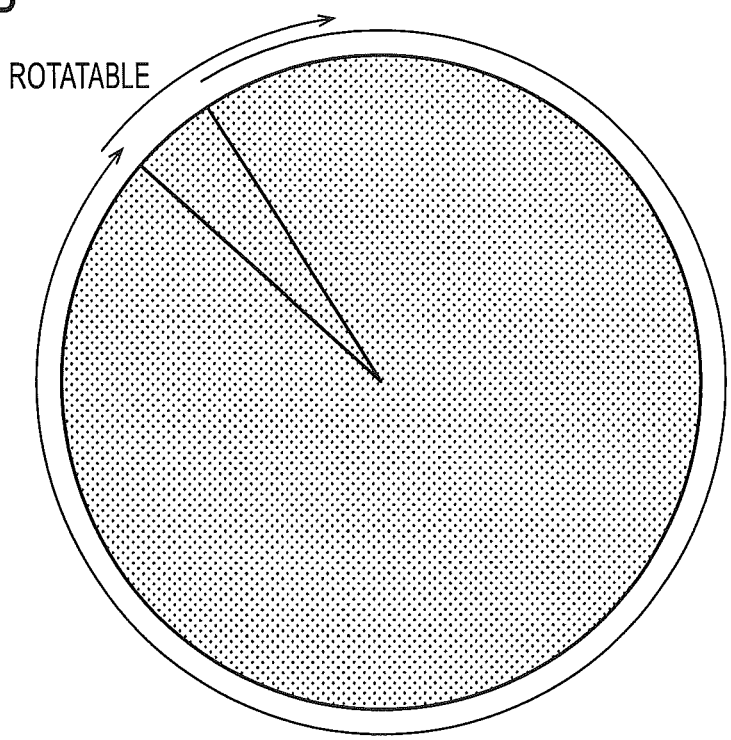
FIG. 13B is an explanatory diagram for explaining a range of rotation of the first connector and the cylindrical portion, shown in FIG. 13A, relative to each other.

FIGS. 13A and 13B show a rotation check lock portion 11a and a rotation prevention wall 14a of a first comparative example. As shown in FIG. 13A, the first comparative example is provided with only the single rotation check lock portion 11a and the single rotation prevention wall 14a. Like in the foregoing embodiment, the rotation check lock portion 11a is provided capable of retreating outward from the inner surface through elastic deformation. Like in the foregoing embodiment, the two side surfaces of the rotation prevention wall 14a are provided with a taper surface t and a vertical surface h, respectively. The first comparative example can block excessive rotation in one rotational direction (the counterclockwise direction shown in FIG. 13), but cannot prevent excessive rotation in the other rotational direction (the clockwise direction shown in FIG. 13).

Figure 14A:
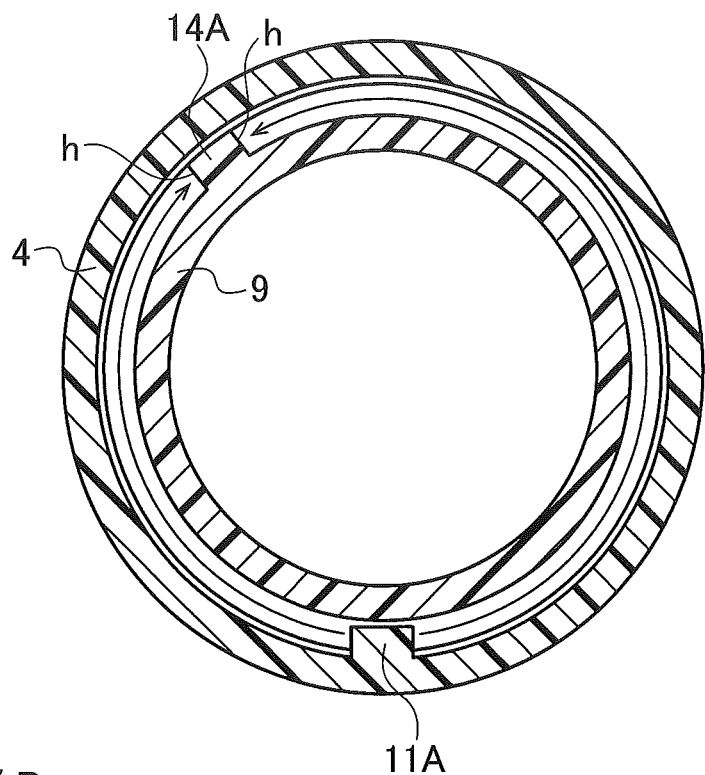
FIG. 14A is a cross-sectional view of a first connector and a third connector of a second comparative example.
Figure 14B:
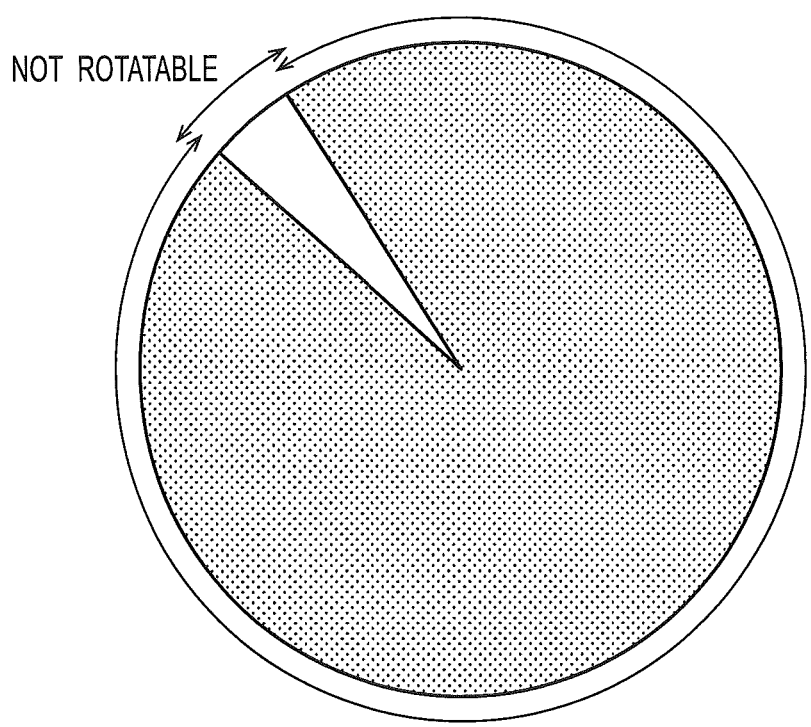
FIG. 14B is an explanatory diagram for explaining a range of rotation of the first connector and the third connector, shown in FIG. 14A, relative to each other.
Figure 15:
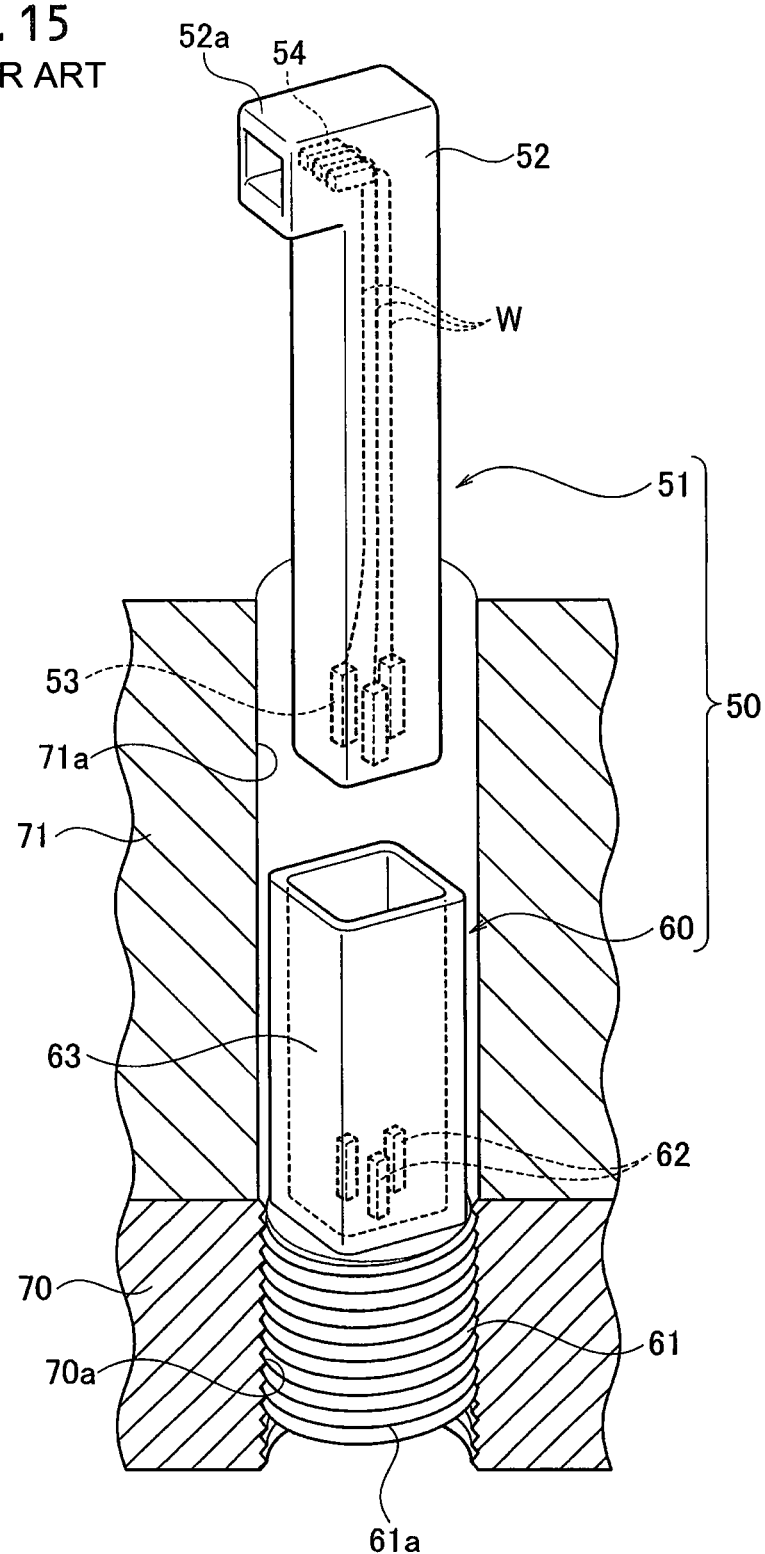
FIG. 15 is a schematic perspective view of a connector device shown as a conventional example.

FIGS. 14A and 14B show a rotation check lock portion 11A and a rotation prevention wall 14A of a second comparative example. As shown in FIG. 14A, the second comparative example is provided with only the single rotation check lock portion 11A and the single rotation prevention wall 14A. The rotation check lock portion 11A does not change its position through elastic deformation. The two side surfaces of the rotation prevention wall 14A are provided with their respective vertical surfaces h. The second comparative example can prevent excessive rotation in both the rotational directions. However, because as shown in FIG. 14B, a region not allowing the rotation is formed in a part of the 360-degree area, the second comparative example cannot secure 180 degrees as the maximum rotational range in either the leftward or rightward rotational direction. Accordingly, the second comparative example involves the likelihood that the connector fitting operation can be performed securely.

The rotation block portion is formed from: the first and second rotation check lock portions 11*a*, 11*b* provided to the first housing portion 4; and the lock groove 12 provided to the third housing portion 6, and into which the first and second rotation check lock portions 11*a*, 11*b* are fitted while at the pre-fit position. The rotation guide portion is configured such that the first and second rotation check lock portions 11*a*, 11*b*, as well as the first and second rotation rail portion 13*a*, 13*b* provided to the first housing portion 4 and guiding the first and second rotation check lock portion 11*a*, 11*b* while at the pre-fit position, are concurrently used for the rotation guide portion. Accordingly, since the first and second rotation check lock portions 11*a*, 11*b* serve as both a member for the rotation block portion and a member for the rotation guide portion, the embodiment can achieve things such as simplifying the configuration, and reducing the number of parts.

The rotation base rail portion 13 and the rotation guide portions 11 configured to move while guided by the rotation base rail portion 13 are provided separately from the first and second rotation rail portions 13*a*, 13*b* and the first and second rotation check lock portions 11*a*, 11*b*. Accordingly, since the embodiment includes the rotation guides which do not interfere with the first rotation prevention wall 14*a* or the second rotation prevention wall 14*b*, the first housing portion 4 smoothly rotates relative to the third housing portion 6.

The connector device 1 is formed such that: the first housing portion 4 is rotatably provided to the main body portion 8, and the first housing portion 4 is provided with the guide rib 16; and the second housing portion 19 is provided with the guide rail surface 19*a* as the rotational direction guide portion configured to, no matter what rotational position the guide rib 16 is initially located at, place the guide rib 16 at the normal rotational position through the guidance before the first terminals T1 and the second terminals T2 reach the position where the first terminals T1 start to contact the second terminals T2. For this reason, even if the fitting of the first housing portion 4 and the second housing portion 19 starts while the first housing portion 4 and the second housing portion 19 are not at the normal fit rotation position, the guide rib 16 and the guide rail surface 19*a* make the first housing portion 4 and the second housing portion 19 located at the normal fit rotation position before the first terminals T1 and the second terminals T2 reach the position where the first terminals T1 start to contact the second terminals T2. This enable the work of fitting the first housing portion 4 and the second housing portion 19 to be easily performed even if the rotational position of the second housing portion 19 of the sensor-side connector 3 remains unknown. Accordingly, the work of fitting the housing portions can be easily performed even if either of the mating housing portions is not visibly clearly recognized, and excessive twist of the electrical wires W can be prevented.

In the foregoing embodiment, the third housing portion 6 is provided with the rotation rail portions 13*a*, 13*b*, while the first housing portion 4 is provided with the rotation check lock portions 11*a*, 11*b*. Instead, however, the third housing portion may be provided with the rotation check lock portions, while the first housing portion may be provided with the rotation rail portions.

In the foregoing embodiment, the third housing portion 6 is provided with the rotation base rail portion 13, while the first housing portion 4 is provided with the rotation guide portions 11. Instead, however, the third housing portion may be provided with the rotation guide portions, while the first housing portion may be provided with the rotation base rail portion.

In the foregoing embodiment, the first housing portion 4 of the wire harness-side connector 2 is provided with the guide rib 16, while the second housing portion 19 of the sensor-side connector 3 is provided with the guide rail surface 19*a*. Instead, however, the first housing portion of the wire harness-side connector may be provided with the guide rail surface, while the second housing portion of the sensor-side connector may be provided with the guide rail surface.

In the foregoing embodiment, the connector device 1 integrally includes the combustion pressure sensor device (not illustrated), and is attached to the cylinder head 21 of the engine 20. However, the present invention is not limited to this embodiment. It is a matter of course that: for example, whether or not the connector device includes the sensor device, the present invention is applicable to the connector device; and the present invention is applicable to a connector device integrally including a component other than the sensor device. Although the connector device of the present invention is effective for the case where either of the mating housing portions is not visibly clearly recognized, the connector device of the present invention is usable when the mating housing portions are visible. In other words, the present invention makes it possible to easily perform the fitting work no matter what direction (rotational position) either of the mating housing portions is in.

No matter what embodiment is used, while the first and third housing portions are at the pre-fit position, the rotation block portion blocks the rotation of the first housing portion relative to the third housing portion, and the first housing portion accordingly does not rotate relative to the third housing portion. Thus, the rotation before the connector fitting can be blocked. Furthermore, while the first and third housing portions are at the fit-rotation position, the rotation guide portion guides the rotation of the first housing portion relative to the third housing portion, and the first housing portion rotates relative to the third housing portion. This enables the connector fitting operation to be performed. Thereby, the rotation other than due to the connector fitting operation can be blocked. Accordingly, it is possible to prevent excessive twist of the electrical wires laid between the first terminals T1 and the third terminals T3.

What is claimed is:

1. A connector device comprising:
   a first connector including a first housing portion inside which a first terminal is placed; and
   a second connector including a second housing portion inside which a second terminal is placed,
   the first housing portion being configured to rotate and be fitted into the second housing portion when the first housing portion is not oriented in a direction in which the first housing portion is fitted into the second housing portion, and
   while at a fitting completion position, the first terminal and the second terminal being connected together, wherein the first connector includes a third connector attached to the first housing portion, the third connector includes a third housing portion inside which a third terminal is placed, and the first terminal and the third terminal are electrically connected together with an electrical wire, the first housing portion is formed capable of moving relative to the third housing portion between a pre-fit position and a fit-rotation position, and the first housing portion and the third housing portion are provided with:
- a rotation block portion configured to, while at the pre-fit position, block rotation of the first housing portion relative to the third housing portion; and
- a rotation guide portion configured to, while at a rotation start position, guide the rotation of the first housing portion relative to the third housing portion.

2. The connector device according to claim 1, wherein the rotation block portion includes:
- a rotation check lock portion provided to one of the first housing portion and the third housing portion; and
- a locked portion which is provided to the other of the first housing portion and the third housing portion, and into which the rotation check lock portion is fitted while at the pre-fit position, and the rotation guide portion includes:
- the rotation check lock portion; and
- a rotation rail portion provided to the other of the first housing portion and the third housing portion, and configured to guide the rotation check lock portion while at the fit-rotation position.

3. The connector device according to claim 2, wherein one of the first housing portion and the third housing portion is provided with first and second rotation rail portions including first and second rotation prevention walls, and the other of the first housing portion and the third housing portion is provided with first and second rotation check lock portions configured to move along the respective rotation rail portions, the first rotation prevention wall and the first rotation check lock portion are configured such that the first rotation prevention wall allows rotation of the first rotation check lock portion beyond the first rotation prevention wall in one rotational direction, and that the first rotation prevention wall blocks rotation of the first rotation check lock portion beyond the first rotation prevention wall in another rotational direction, the second rotation prevention wall and the second rotation check lock portion are configured such that the second rotation prevention wall blocks rotation of the second rotation check lock portion beyond the second rotation prevention wall in the one rotational direction, and that the second rotation prevention wall allows rotation of the second rotation check lock portion beyond the second rotation prevention wall in the other rotational direction, and the first rotation prevention wall is set at such a rotational position that the first rotation check lock portion is blocked after rotating by 180 degrees or more in the other rotational direction, and the second rotation prevention wall is set at such a rotational position that the second rotation check lock portion is blocked after rotating by 180 degrees or more in the one rotational direction.

4. The connector device according to claim 1, wherein one of the first and second housing portions is provided with a guide rib, and the other of the first and second housing portions is provided with a rotational direction guide portion configured to guide the guide rib such that no matter what rotational position the guide rib is located at, the first and second housing portions are located at a normal fit rotation position before the first terminal and the second terminal reach a position where the first terminal starts to contact the second terminal, whereby the first housing portion rotates and is fitted to the second housing portion when the first housing portion is not oriented in the direction in which the first housing portion is fitted into the second housing portion.

5. The connector device according to claim 2, wherein one of the first and second housing portions is provided with a guide rib, and the other of the first and second housing portions is provided with a rotational direction guide portion configured to guide the guide rib such that no matter what rotational position the guide rib is located at, the first and second housing portions are located at a normal fit rotation position before the first terminal and the second terminal reach a position where the first terminal starts to contact the second terminal, whereby the first housing portion rotates and is fitted to the second housing portion when the first housing portion is not oriented in the direction in which the first housing portion is fitted into the second housing portion.

6. The connector device according to claim 3, wherein one of the first and second housing portions is provided with a guide rib, and the other of the first and second housing portions is provided with a rotational direction guide portion configured to guide the guide rib such that no matter what rotational position the guide rib is located at, the first and second housing portions are located at a normal fit rotation position before the first terminal and the second terminal reach a position where the first terminal starts to contact the second terminal, whereby the first housing portion rotates and is fitted to the second housing portion when the first housing portion is not oriented in the direction in which the first housing portion is fitted into the second housing portion.

* * * * *